(12) United States Patent
Shi

(10) Patent No.: US 12,015,455 B2
(45) Date of Patent: Jun. 18, 2024

(54) CAPABILITY INFORMATION REPORTING METHOD, PRECODING MATRIX INDICATOR FEEDBACK METHOD AND COMMUNICATION DEVICE

(71) Applicant: VIVO MOBILE COMMUNICATION CO., LTD., Guangdong (CN)

(72) Inventor: Yuan Shi, Dongguan (CN)

(73) Assignee: Vivo Mobile Communication Co., Ltd., Dongguan (CN)

( * ) Notice: Subject to any disclaimer, the term of this patent is extended or adjusted under 35 U.S.C. 154(b) by 390 days.

(21) Appl. No.: 17/382,400

(22) Filed: Jul. 22, 2021

(65) Prior Publication Data

US 2021/0351818 A1  Nov. 11, 2021

Related U.S. Application Data

(63) Continuation of application No. PCT/CN2020/072401, filed on Jan. 16, 2020.

(30) Foreign Application Priority Data

Jan. 22, 2019 (CN) .......................... 201910060497.9

(51) Int. Cl.
    *H04B 7/0417* (2017.01)
    *H04B 7/06* (2006.01)
    *H04W 8/24* (2009.01)

(52) U.S. Cl.
    CPC ......... *H04B 7/0417* (2013.01); *H04B 7/0626* (2013.01); *H04B 7/0632* (2013.01); *H04B 7/0639* (2013.01); *H04W 8/24* (2013.01)

(58) Field of Classification Search
    CPC ...... H04B 7/0417; H04B 7/0626; H04W 8/24
    See application file for complete search history.

(56) References Cited

U.S. PATENT DOCUMENTS

| | | | |
|---|---|---|---|
| 9,019,902 B2 | 4/2015 | Damnjanovic et al. | |
| 10,505,614 B2 | 12/2019 | Chen et al. | |
| 2010/0067616 A1* | 3/2010 | Chun | H04B 7/0639 375/295 |
| 2012/0034911 A1* | 2/2012 | Han | H04B 7/024 455/422.1 |

(Continued)

FOREIGN PATENT DOCUMENTS

| | | |
|---|---|---|
| CN | 102082636 A | 6/2011 |
| CN | 102149130 A | 8/2011 |

(Continued)

OTHER PUBLICATIONS

International Search Report and Written Opinion of the International Searching Authority regarding International Patent Application No. PCT/CN2020/072401, dated Apr. 15, 2020. Translation provided by Bohui Intellectual Property.

(Continued)

*Primary Examiner* — Zhiren Qin
(74) *Attorney, Agent, or Firm* — Harness, Dickey & Pierce, P.L.C.

(57) ABSTRACT

A capability information reporting method includes: reporting capability information, the capability information being used to indicate whether a terminal supports a first capability, and the first capability being a capability of supporting that a PMI subband size is less than a CQI subband size.

15 Claims, 6 Drawing Sheets

When a terminal supports a first PMI subband size, feed back a first PMI based on a first PMI subband size — 401

(56) References Cited

U.S. PATENT DOCUMENTS

| | | | |
|---|---|---|---|
| 2013/0070720 A1 | 3/2013 | Pan et al. | |
| 2014/0056272 A1 | 2/2014 | Gao et al. | |
| 2015/0327246 A1* | 11/2015 | Kim | H04B 7/0626 |
| | | | 370/329 |
| 2017/0026953 A1* | 1/2017 | Wang | H04B 7/066 |
| 2018/0219598 A1* | 8/2018 | Kim | H04B 7/0478 |
| 2019/0238274 A1* | 8/2019 | Zhao | H04W 24/10 |
| 2019/0280750 A1* | 9/2019 | Rahman | H04L 25/03923 |
| 2021/0367652 A1* | 11/2021 | Wernersson | H04B 7/0634 |

FOREIGN PATENT DOCUMENTS

| | | |
|---|---|---|
| CN | 102265548 A | 11/2011 |
| CN | 102638337 A | 8/2012 |
| CN | 103391154 A | 11/2013 |
| CN | 104854902 A | 8/2015 |
| CN | 107181562 A | 9/2017 |

OTHER PUBLICATIONS

"Outcome of offline session for CSI enhancement for MU-MIMO support," Samsung, 3GPP TSG RAN WG1 Meeting #95, R1-1814131, Nov. 16, 2018.

First Office Action regarding Chinese Patent Application No. 201910060497.9, dated Nov. 25, 2020. Translation provided by Bohui Intellectual Property.

Second Office Action regarding Chinese Patent Application No. 201910060497.9, dated May 21, 2021. Translation provided by Bohui Intellectual Property.

Supplementary European Search Report regarding Patent Application No. 20744847.3-1212/3917185; PCT/CN2020/072401, dated Feb. 18, 2022.

"Discussion on CSI enhancement," Huawei, HiSilicon, 3GPP TSG RAN WG1 Ad-Hoc Meeting 1901, R1-1900016, dated Jan. 25, 2019.

* cited by examiner

CAPABILITY INFORMATION REPORTING METHOD, PRECODING MATRIX INDICATOR FEEDBACK METHOD AND COMMUNICATION DEVICE

CROSS-REFERENCE TO RELATED APPLICATIONS

This application is a Bypass Continuation Application of PCT/CN2020/072401 filed on Jan. 16, 2020, which claims priority to Chinese Patent Application No. 201910060497.9, filed on Jan. 22, 2019, which are incorporated herein by reference in their entirety.

TECHNICAL FIELD

The present disclosure relates to the field of communication technologies, and in particular, to a capability information reporting method, a precoding matrix indicator (PMI) feedback method and a communication device.

BACKGROUND

In a communication system, a terminal often needs to feed back channel state information (CSI) to a network, where the CSI includes a PMI. However, in practical applications, a PMI subband size supported by the terminal may not match a PMI subband size understood by a network side, resulting in poor performance of the terminal.

SUMMARY

According to a first aspect, some embodiments of the present disclosure provide a capability information reporting method, applied to a terminal, including:
  reporting capability information, where the capability information is used to indicate whether the terminal supports a first capability, and the first capability is a capability of supporting that a precoding matrix indicator PMI subband size is less than a channel quality indicator (CQI) subband size.

According to a second aspect, some embodiments of the present disclosure provide a PMI feedback method, applied to a terminal, including:
  in a case where the terminal supports a first PMI subband size, feeding back a first PMI based on the first PMI subband size, where the first PMI subband size is less than a CQI subband size.

According to a third aspect, some embodiments of the present disclosure provide a capability information reporting method, applied to a network device, including:
  receiving reported capability information, where the capability information is used to indicate whether a terminal supports a first capability, and the first capability is a capability of supporting that a PMI subband size is less than a CQI subband size.

According to a fourth aspect, some embodiments of the present disclosure provide a PMI feedback method, applied to a network device, including:
  when a terminal supports a first PMI subband size, receiving a first PMI fed back by the terminal based on the first PMI subband size, where the first PMI subband size is less than a CQI subband size.

According to a fifth aspect, some embodiments of the present disclosure provide a terminal, including:
  a reporting module, configured to report capability information, where the capability information is used to indicate whether the terminal supports a first capability, and the first capability is a capability of supporting that a precoding matrix indicator PMI subband size is less than a channel quality indicator CQI subband size.

According to a sixth aspect, some embodiments of the present disclosure provide a terminal, including:
  a first feedback module, configured to: in a case where the terminal supports a first PMI subband size, feed back a first PMI based on the first PMI subband size, where the first PMI subband size is less than a CQI subband size.

According to a seventh aspect, some embodiments of the present disclosure provide a network device, including:
  a receiving module, configured to receive reported capability information, where the capability information is used to indicate whether a terminal supports a first capability, and the first capability is a capability of supporting that a PMI subband size is less than a CQI subband size.

According to an eighth aspect, some embodiments of the present disclosure provide a network device, including:
  a first receiving module, configured to: when a terminal supports a first PMI subband size, receive a first PMI fed back by the terminal based on the first PMI subband size, where the first PMI subband size is less than a CQI subband size.

According to a ninth aspect, some embodiments of the present disclosure provide a terminal, including: a memory, a processor, and a program that is stored in the memory and that can run on the processor, where when the processor executes the program, steps of the capability information reporting method provided in the first aspect are implemented, or when the processor executes the program, steps of the PMI feedback method provided in the second aspect are implemented.

According to a tenth aspect, some embodiments of the present disclosure provide a network device, including: a memory, a processor, and a program stored in the memory and executable on the processor, where when the processor executes the program, steps of the capability information reporting method provided in the third aspect are implemented, or when the processor executes the program, steps of the PMI feedback method provided in the fourth aspect are implemented.

According to an eleventh aspect, some embodiments of the present disclosure provide a non-transitory computer-readable storage medium, where the non-transitory computer-readable storage medium stores a computer program, and when the processor executes the computer program, steps of the capability information reporting method provided in the first aspect are implemented, or when the processor executes the program, steps of the PMI feedback method provided in the second aspect are implemented, or steps of the capability information reporting method provided in the third aspect are implemented, or when the processor executes the program, steps of the PMI feedback method provided in the fourth aspect are implemented.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of this disclosure, the term such as "exemplary" or "for example" is used to represent an example, an instance, or an illustration. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiments of the present disclosure are described below with reference to the accompanying drawings. The capability information reporting method, the PMI feedback method, and the communication device provided in some embodiments of the present disclosure may be applied to a wireless communications system. The wireless communications system may be a 5G system, an evolved Long Term Evolution (eLTE) system, an LTE system, a subsequent evolved communications system, or the like.

Figure 1:
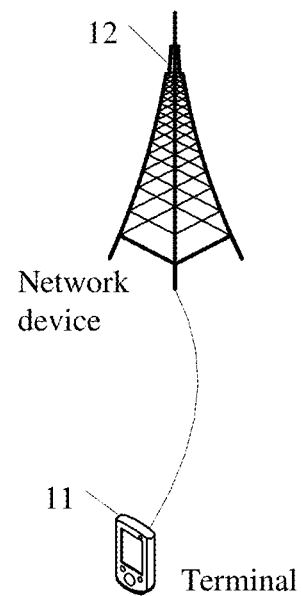
FIG. 1 is a structural diagram of a network system that can be applied to some embodiments of the present disclosure.

Referring to FIG. 1, FIG. 1 is a structural diagram of a network system that can be applied to some embodiments of the present disclosure. As shown in FIG. 1, the network system includes: a terminal 11 and a network device 12, where the terminal 11 may be a user terminal (User Equipment, UE) or other terminal side device, for example, may be a terminal side device such as a mobile phone, a tablet personal computer, a laptop computer, a personal digital assistant (PDA), a mobile Internet device (MID), or a wearable device. It should be noted that a possible type of the terminal 11 is not limited in some embodiments of the present disclosure. The network device 12 may be a base station in 4G, 5G, or later releases, or a base station in other communications systems, or is referred to as a Node B, an Evolved Node B, a transmission reception point (TRP), an access point (AP), or other words in the field, as long as the same technical effect is achieved. The network device is not limited to specific technical words. In addition, the network device 12 may be a master node (MN) or a secondary node (SN). It should be noted that in some embodiments of the present disclosure, only the 5G base station is used as an example, but a specific type of the network device is not limited.

Figure 2:
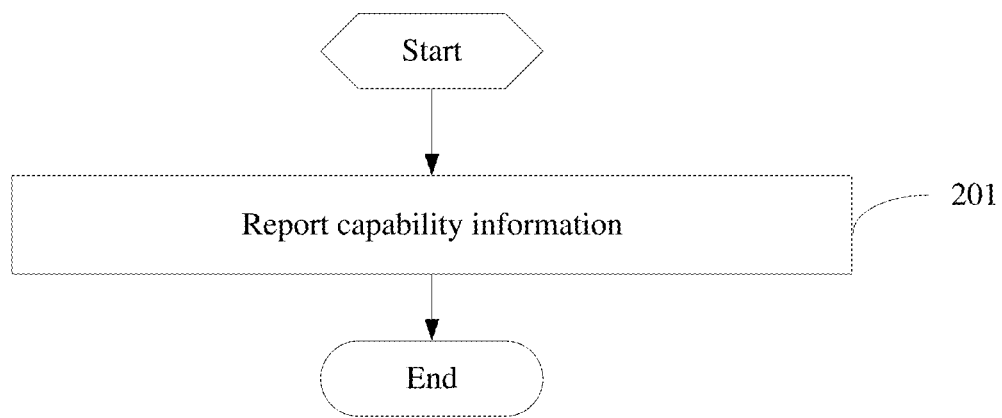
FIG. 2 is a flowchart of a capability information reporting method according to some embodiments of the present disclosure.

Referring to FIG. 2, FIG. 2 is a flowchart of a capability information reporting method according to some embodiments of the present disclosure. The method is applied to a terminal. As shown in FIG. 2, the method includes the following steps.

Step 201: Receive reported capability information, where the capability information is used to indicate whether a terminal supports a first capability, and the first capability is a capability of supporting that a PMI subband size is less than a CQI subband size.

In step 201, the terminal may report the capability information to the network device, where the capability information may be actively reported by the terminal, or may be reported after the terminal receives capability request information sent by the network device.

Figure 3:
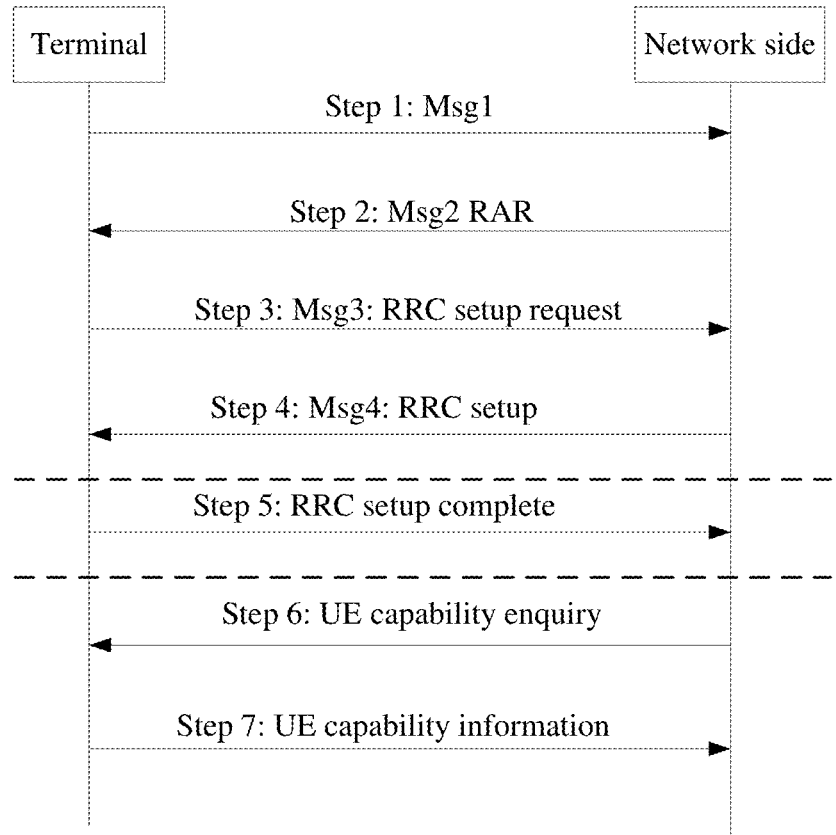
FIG. 3 is a schematic diagram of capability information reporting according to some embodiments of the present disclosure.

FIG. 3 is used as an example below. An example in which the terminal reports the capability information after a connection is established is used for description:

Step 1: The terminal initiates a connection establishment process, initiates a random access process, and sends a message (Msg) 1 including a preamble.

Step 2: A network side sends a random access response message (RAR), namely, Msg2 according to the Msg1 sent by the terminal, where the RAR carries an uplink resource for Msg3 transmission.

Step 3: The terminal sends Msg3, for example: an RRC setup request message of a 5G system or an RRC connection request message of a 4G LTE system, according to information about a resource allocated in the Msg2.

Step 4: The network side sends Msg4 of the random access process to the terminal according to the Msg3 sent by the terminal. The terminal establishes a corresponding RRC connection after contention resolution succeeds. For example: the network side sends a contention resolution message to the terminal. At the same time, the 5G system can send an RRC setup message, and the 4G LTE system can send an RRC connection setup message.

Step 5: After the terminal executes the connection configuration message delivered by the network side, the terminal feeds back a connection configuration complete message to the network side, for example: an RRC setup complete message for the 5G system, or an RRC connection setup complete message for the 4G LTE system.

Step 6: To better configure an air interface connection for the terminal according to the capability of the terminal, the network side can send capability request information to the terminal, for example: a UE capability enquiry message.

Step 7: The terminal reports the capability information of the terminal to the network side according to the request information of the network side in step 6, for example: sends a UE capability information message.

Certainly, transmission of the capability information shown in FIG. 3 is only an example, and some embodiments of the present disclosure are not limited thereto.

In addition, that the capability information is used to indicate whether the terminal supports the first capability can be understood as: in addition to indicating whether the terminal supports the first capability, the capability information may also represent or indicate other capabilities of the terminal. Certainly, other capabilities of the terminal may not be represented or indicated, which is not limited, and can be specifically reported according to an actual situation.

The PMI subband size can also be referred to as a subband size of a PMI, for example: a number of physical resource blocks (PRB) included in a PMI subband. In addition, the subband size can be referred to as a granularity of PMI feedback, which is abbreviated as a PMI granularity, that is, the PMI subband size can be used as a granularity for PMI feedback. Similarly, the CQI subband size can be a subband size of a CQI, for example: a number of PRBs included in a CQI subband. The subband size can be referred to as a granularity of CQI feedback, which is abbreviated as a CQI granularity, that is, the CQI subband size can be used as a granularity for CQI feedback.

The capability of supporting that a PMI subband size is less than a CQI subband size may be: one or more PMI subband sizes supported by the terminal include a PMI subband size smaller than or equal to the CQI subband size. For example: the terminal supports a PMI subband size equal to CQI subband size/2, supports a PMI subband size equal to CQI subband size/4, and also supports a PMI subband size equal to CQI subband size/1.

In addition, the PMI subband size and CQI subband size in some embodiments of the present disclosure may be configured on the network side, or defined in the protocol, or the like, which is not limited.

In some embodiments of the present disclosure, since the supported PMI subband size is smaller than the CQI subband size, a PMI that is fed back can be more accurate, to improve the communication performance of the communication system and the performance of the terminal.

It should be noted that in some embodiments of the present disclosure, that the PMI subband size is smaller than the CQI subband size can be represented by PMI subband size=CQI subband size/R, where R is a positive integer greater than or equal to 1. For example: R can be {2, 4} or the like, which is certainly not limited.

In some embodiments of the present disclosure, since the capability information reported by the terminal indicates whether the first capability is supported, after the network device receives the capability information, the network device can determine whether the terminal supports the first capability, so that the PMI subband size supported by the terminal matches the PMI subband size understood by the network device. Therefore, in PMI feedback between the terminal and the network device, the PMI subband size can be smaller than the CQI subband size, thereby improving the performance of the terminal and improving the accuracy of PMI feedback, thereby improving communication efficiency.

In addition, when the capability information is used to indicate whether the terminal supports the first capability, the capability information can explicitly indicate whether the first capability is supported, or implicitly indicate whether the first capability is supported.

For example: in an implementation, the capability information includes first indication information, and the first indication information is used to indicate whether the terminal supports the first capability.

The first indication information can have 1 bit to reduce information overheads. For example: when the 1 bit is 1, it means that the first capability is supported, and when the 1 bit is 0, it means that the first capability is not supported.

For example: in another implementation, if the capability information does not include indication information of the first capability, the capability information indicates that the terminal supports the first capability.

In this implementation, if the capability information does not include the indication information of the first capability, it can mean that the terminal does not support the first capability by default. In this way, the first capability may be reported without modifying the capability information, thereby reducing complexity.

For example: in another implementation, if the capability information does not include indication information of the first capability, the capability information indicates that the terminal supports the first capability.

If the capability information does not include the indication information of the first capability, it can mean that the terminal supports the first capability by default. In this way, the first capability may be reported without modifying the capability information, thereby reducing complexity.

In an optional implementation, in a case where the capability information indicates that the terminal supports the first capability, the capability information includes second indication information used to indicate a minimum PMI subband size supported by the terminal.

The minimum PMI subband size can be the smallest PMI subband size among one or more PMI subband sizes supported by the terminal, for example: PMI subband size=CQI subband size/R. When the terminal supports R being 1, R being 2, and R being 4, the minimum PMI subband size is CQI subband size/4.

In this embodiment, the minimum PMI subband size supported by the terminal can be further indicated, so that the PMI subband sizes of the terminal and the network device can match to higher extent, so as to further improve the performance of the terminal.

Optionally, the second indication information may be used to indicate a maximum R value supported by the terminal, and the maximum R value is a value obtained by dividing the CQI subband size by the minimum PMI subband size.

In this implementation, the minimum PMI subband size supported by the terminal can be indicated to the network device through the maximum R value, thereby reducing overheads of capability information.

Optionally, the second indication information occupies 1 bit. For example, when the 1 bit is 0, it means that the maximum R value supported by the terminal is 2, that is, the R value supported by the terminal does not exceed 2; and when the 1 bit is 1, it means that the maximum R value supported by the terminal is 4, that is, the R value supported by the terminal does not exceed 4, and vice versa. This is not limited.

Some embodiments of the present disclosure can be implemented as follows through the above step:

when the terminal reports a capability, reporting a capability of whether the PMI subband size is smaller than the CQI subband size is supported.

A reporting method can be using 1 bit to indicate whether the capability is supported.

Alternatively, the terminal does not report the capability, and it means that the terminal supports the capability by default.

Alternatively, the terminal does not report the capability, and it means that the terminal does not support the capability by default.

When the terminal supports the capability by default or uses 1 bit to indicate that the capability is supported, 1 bit can be used to indicate a supported minimum PMI subband size. When the 1 bit is 0, it means that the R value supported by the terminal does not exceed 2, and when the 1 bit is 1, it means that the R value supported by the terminal does not exceed 4, and vice versa.

Some embodiments of the present disclosure can improve the performance of the terminal. For example, the problem of deteriorated performance due to mismatch of PMI subband sizes can be solved when the capability of the terminal is poor.

Figure 4:
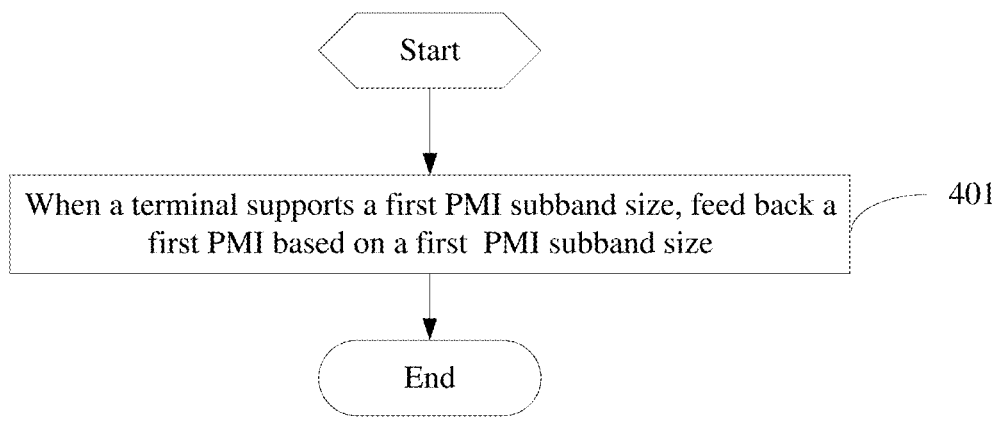
FIG. 4 is a flowchart of a PMI feedback method according to some embodiments of the present disclosure.

Referring to FIG. 4, FIG. 4 is a flowchart of a PMI feedback method according to some embodiments of the present disclosure. As shown in FIG. 4, the method includes the following steps:

Step 401: In a case where the terminal supports a first PMI subband size, feed back a first PMI based on the first PMI subband size, where the first PMI subband size is less than a CQI subband size.

The first PMI subband size can be configured by the network device. For example: the first PMI subband size can be configured for the terminal by the network device before step 401, for example: the network device configures indication information of the PMI subband size for the terminal, that is, indicates the first PMI subband size.

The feeding back the first PMI based on the first PMI subband size may indicate that a subband size of the PMI is the first PMI subband size.

In step 401, since the terminal supports the first PMI subband size, PMI feedback can be performed normally, for example, CSI including a PMI is fed back normally, that is, the PMI in the CSI is fed back based on the first PMI subband size, and no additional indication message is added to the CSI. Since the first PMI is fed back based on the first PMI subband size, it can be understood as that the first PMI is used to implicitly indicate that the terminal supports the first PMI subband size. In addition, the first PMI is fed back normally, and there is no need to add an additional indication message to the CSI, which can reduce complexity.

That the terminal supports the first PMI subband size may be that the terminal may perform PMI feedback according to the first PMI subband size, or may be understood as that the PMI subband size supported by the terminal includes the first PMI subband size, or the minimum PMI subband size supported by the terminal is less than or equal to the first PMI subband size.

In addition, for the first PMI subband size and the CQI subband size, refer to the corresponding description of the embodiment shown in FIG. 2, which will not be repeated herein.

In this embodiment, through the above steps, the PMI subband size supported by the terminal can match the PMI subband size understood by the network device, thereby improving the performance of the terminal, improving the accuracy of PMI feedback, and improving communication efficiency.

As an optional implementation, the method further includes:

when the terminal does not support the first PMI subband size, feeding back a second PMI based on a second PMI subband size, where CSI corresponding to the second PMI includes indication information used to indicate the second PMI subband size.

The CSI corresponding to the second PMI may be CSI including the second PMI.

In this implementation, feedback can be performed according to the second PMI subband size when the terminal does not support the first PMI subband size configured by the network device, to ensure that the PMI can be fed back, and the network device can also determine the second PMI subband size according to the indication information, so that the PMI subband size supported by the terminal matches the PMI subband size understood by the network device, thereby improving the performance of the terminal.

Optionally, the CSI includes Part1 and Part2, the Part1 includes the indication information, and the Part 2 includes the PMI.

In this embodiment, the terminal may feed back type II CSI, and the indication information is fed back through Part 1 of the CSI and the PMI is fed back through Part 2, so that the network device can parse the PMI when determining the second PMI subband size according to the indication information, thereby reducing complexity.

Certainly, in some embodiments of the present disclosure, the CSI is not limited to Type II CSI, for example, may also be Type I CSI.

Optionally, the second PMI subband size is the minimum PMI subband size supported by the terminal.

In this way, the terminal can feed back the PMI according to the minimum PMI subband size, thereby improving the accuracy of the PMI. Certainly, this is not limited, for example: the second PMI subband size can be any PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

For the R value, refer to the corresponding description of the embodiment shown in FIG. 2, which will not be repeated herein.

In this implementation, the maximum R value is indicated by 1 bit, thereby reducing the overheads of CSI. For example, 0 means R=1 and 1 means R=2, and vice versa, which is not limited.

Some embodiments of the present disclosure can be implemented as follows through the above step:

The network side configures the indication information of the PMI subband size for the terminal.

If the capability of the terminal supports the PMI subband size indicated by the indication information, the terminal performs CSI feedback normally without adding an additional indication message.

If the capability of the terminal does not support the PMI subband size indicated by the indication information, the terminal feeds back the indication information of the PMI subband size in part 1 of a CSI report, to indicate the PMI subband size fed back in the CSI report. The indication information of the PMI subband size fed back by the terminal is fed back in part 1. 1 bit can be used in the indication information of the PMI subband size to represent the PMI subband size supported by the terminal. 0 means R=1 and 1 means R=2, and vice versa.

Some embodiments of the present disclosure can improve the performance of the terminal. For example, the problem of deteriorated performance due to mismatch of PMI subband sizes can be solved when the capability of the terminal is poor.

Figure 5:
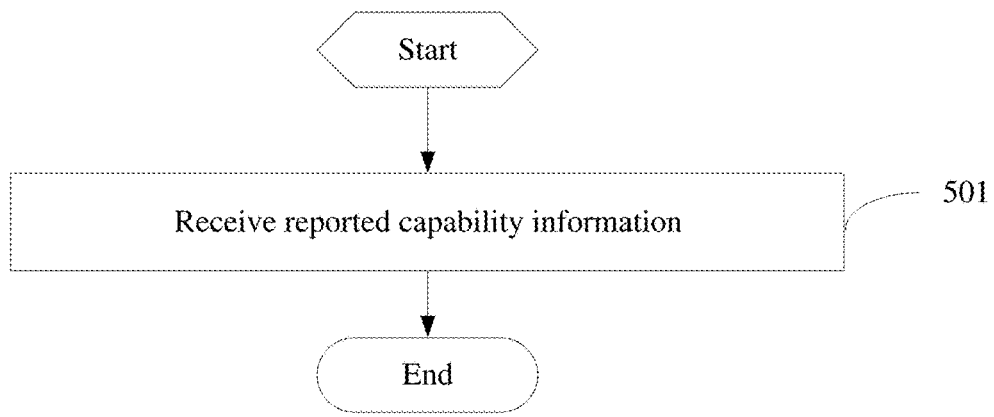
FIG. 5 is another flowchart of a capability information reporting method according to some embodiments of the present disclosure.

Referring to FIG. 5, FIG. 5 is a flowchart of another capability information reporting method according to some embodiments of the present disclosure. The method is applied to a network device. As shown in FIG. 5, the method includes the following step:

Step 501: Receive reported capability information, where the capability information is used to indicate whether a terminal supports a first capability, and the first capability is a capability of supporting that a PMI subband size is less than a CQI subband size.

Optionally, the capability information includes first indication information, and the first indication information is used to indicate whether the terminal supports the first capability; or if the capability information does not include indication information of the first capability, the capability information indicates that the terminal does not support the first capability; or if the capability information does not include indication information of the first capability, the capability information indicates that the terminal supports the first capability.

Optionally, the first indication information occupies 1 bit.

Optionally, in a case where the capability information indicates that the terminal supports the first capability, the capability information includes second indication information used to indicate a minimum PMI subband size supported by the terminal.

Optionally, the second indication information is used to indicate a maximum R value supported by the terminal, and the maximum R value is a value obtained by dividing the CQI subband size by the minimum PMI subband size.

Optionally, the second indication information occupies 1 bit.

It should be noted that this embodiment is used as an implementation of the network device corresponding to the embodiment shown in FIG. 2. For a possible implementation of this embodiment, refer to the related descriptions of the embodiment shown in FIG. 2. To avoid repeated descriptions, details are not described again in this embodiment. A same beneficial effect can also be achieved.

Figure 6:
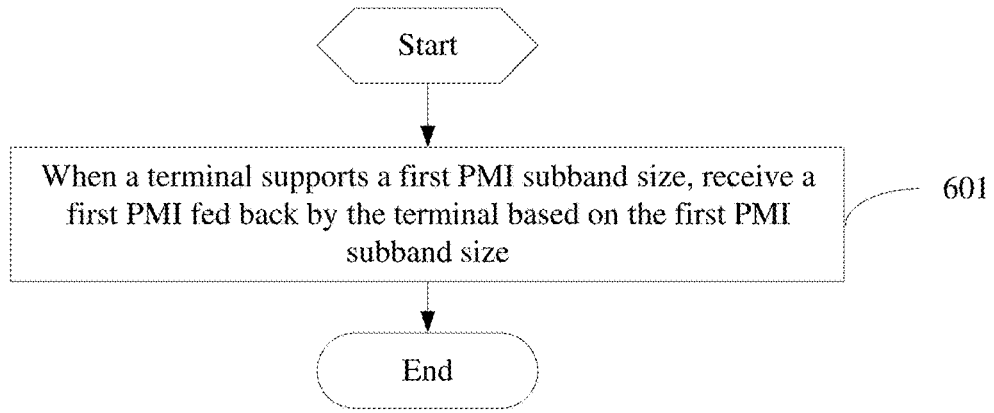
FIG. 6 is another flowchart of a PMI feedback method according to some embodiments of the present disclosure.

Referring to FIG. 6, FIG. 6 is a flowchart of another PMI feedback method according to some embodiments of the present disclosure. The method is applied to a network device. As shown in FIG. 6, the method includes the following step:

Step 601: When a terminal supports a first PMI subband size, receive a first PMI fed back by the terminal based on the first PMI subband size, where the first PMI subband size is less than a CQI subband size.

Optionally, the method further includes:
sending the indication information of the first PMI subband size to the terminal.

Optionally, the method further includes:
when the terminal does not support the first PMI subband size, receiving a second PMI fed back by the terminal based on a second PMI subband size, where CSI corresponding to the second PMI includes indication information used to indicate the second PMI subband size.

Optionally, the CSI includes Part1 and Part2, the Part1 includes the indication information, and the Part2 includes the PMI.

Optionally, the second PMI subband size is a minimum PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

It should be noted that this embodiment is used as an implementation of the network device corresponding to the embodiment shown in FIG. 4. For a possible implementation of this embodiment, refer to the related descriptions of the embodiment shown in FIG. 4. To avoid repeated descriptions, details are not described again in this embodiment. A same beneficial effect can also be achieved.

Figure 7:
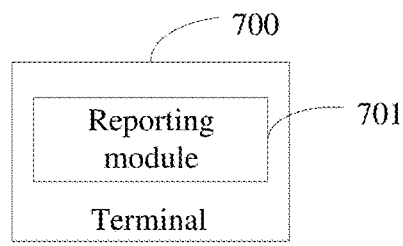
FIG. 7 is a structural diagram of a terminal according to some embodiments of the present disclosure.

Referring to FIG. 7, FIG. 7 is a structural diagram of a terminal according to some embodiments of the present disclosure. As shown in FIG. 7, a terminal 700 includes:

a reporting module 701, configured to report capability information, where the capability information is used to indicate whether a terminal supports a first capability, and the first capability is a capability of supporting that a PMI subband size is less than a CQI subband size.

Optionally, the capability information includes first indication information, and the first indication information is used to indicate whether the terminal supports the first capability; or if the capability information does not include indication information of the first capability, the capability information indicates that the terminal does not support the first capability; or if the capability information does not include indication information of the first capability, the capability information indicates that the terminal supports the first capability.

Optionally, the first indication information occupies 1 bit.

Optionally, in a case where the capability information indicates that the terminal supports the first capability, the capability information includes second indication information used to indicate a minimum PMI subband size supported by the terminal.

Optionally, the second indication information is used to indicate a maximum R value supported by the terminal, and the maximum R value is a value obtained by dividing the CQI subband size by the minimum PMI subband size.

Optionally, the second indication information occupies 1 bit.

The terminal provided in some embodiments of this disclosure can implement the processes implemented by the terminal in the method embodiments of FIG. 2. To avoid repetition, details are not described herein again. The performance of the terminal and the accuracy of PMI feedback can be improved, thereby improving communication efficiency.

Figure 8:
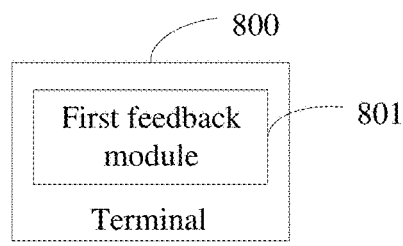
FIG. 8 is another structural diagram of a terminal according to some embodiments of the present disclosure.

Referring to FIG. 8, FIG. 8 is a structural diagram of a terminal according to some embodiments of the present disclosure. As shown in FIG. 8, a terminal 800 includes:

a first feedback module 801, configured to: in a case where the terminal supports a first PMI subband size, feed back a first PMI based on the first PMI subband size, where the first PMI subband size is less than a CQI subband size.

Figure 9:
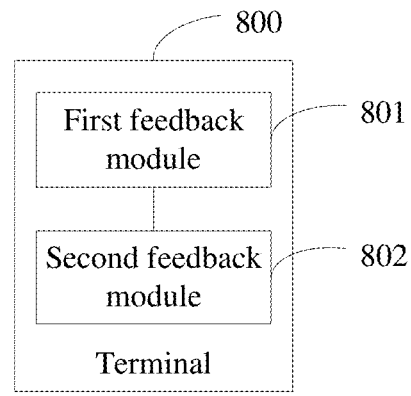
FIG. 9 is another structural diagram of a terminal according to some embodiments of the present disclosure.

Optionally, as shown in FIG. 9, the terminal 800 further includes:
a second feedback module 802, configured to: when the terminal does not support the first PMI subband size, feed back a second PMI based on a second PMI subband size, where CSI corresponding to the second PMI includes indication information used to indicate the second PMI subband size.

Optionally, the CSI includes Part1 and Part 2, the Part1 includes the indication information, and the Part 2 includes the PMI.

Optionally, the second PMI subband size is a minimum PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

The terminal provided in some embodiments of this disclosure can implement the processes implemented by the terminal in the method embodiments of FIG. 4. To avoid repetition, details are not described herein again. The performance of the terminal and the accuracy of PMI feedback can be improved, thereby improving communication efficiency.

Figure 10:
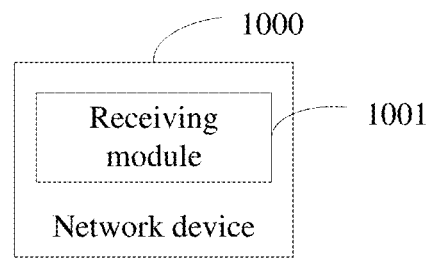
FIG. 10 is a structural diagram of a network device according to some embodiments of the present disclosure.

Referring to FIG. 10, FIG. 10 is a structural diagram of a network device according to some embodiments of the present disclosure. As shown in FIG. 10, a network device 1000 includes:
a receiving module 1001, configured to receive reported capability information, where the capability information is used to indicate whether a terminal supports a first capability, and the first capability is a capability of supporting that a PMI subband size is less than a CQI subband size.

Optionally, the capability information includes first indication information, and the first indication information is used to indicate whether the terminal supports the first capability; or
if the capability information does not include indication information of the first capability, the capability information indicates that the terminal does not support the first capability; or
if the capability information does not include indication information of the first capability, the capability information indicates that the terminal supports the first capability.

Optionally, the first indication information occupies 1 bit.

Optionally, in a case where the capability information indicates that the terminal supports the first capability, the capability information includes second indication information used to indicate a minimum PMI subband size supported by the terminal.

Optionally, the second indication information is used to indicate a maximum R value supported by the terminal, and the maximum R value is a value obtained by dividing the CQI subband size by the minimum PMI subband size.

Optionally, the second indication information occupies 1 bit.

The network device provided in some embodiments of this disclosure can implement the processes implemented by the network device in the method embodiments of FIG. 5. To avoid repetition, details are not described herein again. The performance of the terminal can be improved.

Figure 11:
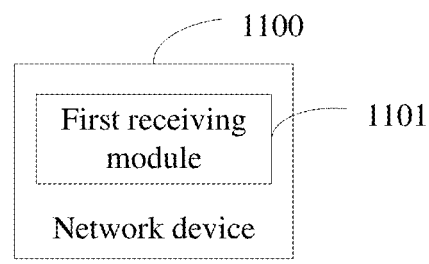
FIG. 11 is another structural diagram of a network device according to some embodiments of the present disclosure.

Referring to FIG. 11, FIG. 11 is a structural diagram of a network device according to some embodiments of the present disclosure. As shown in FIG. 11, a network device 1100 includes:
a first receiving module 1101, configured to: when a terminal supports a first PMI subband size, receive a first PMI fed back by the terminal based on the first PMI subband size, where the first PMI subband size is less than a CQI subband size.

Figure 12:
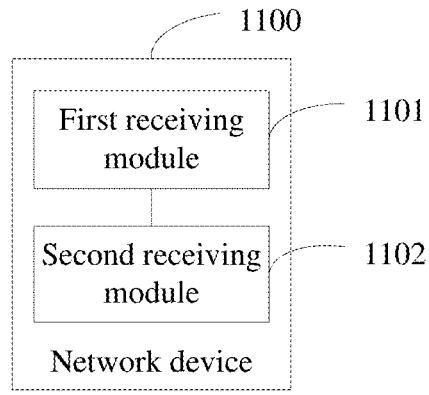
FIG. 12 is another structural diagram of a network device according to some embodiments of the present disclosure.

Optionally, as shown in FIG. 12, the network device 1100 further includes:
a second receiving module 1102, configured to: when the terminal does not support the first PMI subband size, receive a second PMI fed back by the terminal based on a second PMI subband size, where CSI corresponding to the second PMI includes indication information used to indicate the second PMI subband size.

Optionally, the CSI includes Part1 and Part2, the Part1 includes the indication information, and the Part2 includes the PMI.

Optionally, the second PMI subband size is a minimum PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

The network device provided in some embodiments of this disclosure can implement the processes implemented by the network device in the method embodiments of FIG. 6. To avoid repetition, details are not described herein again. The performance of the terminal and the accuracy of PMI feedback can be improved, thereby improving communication efficiency.

Figure 13:
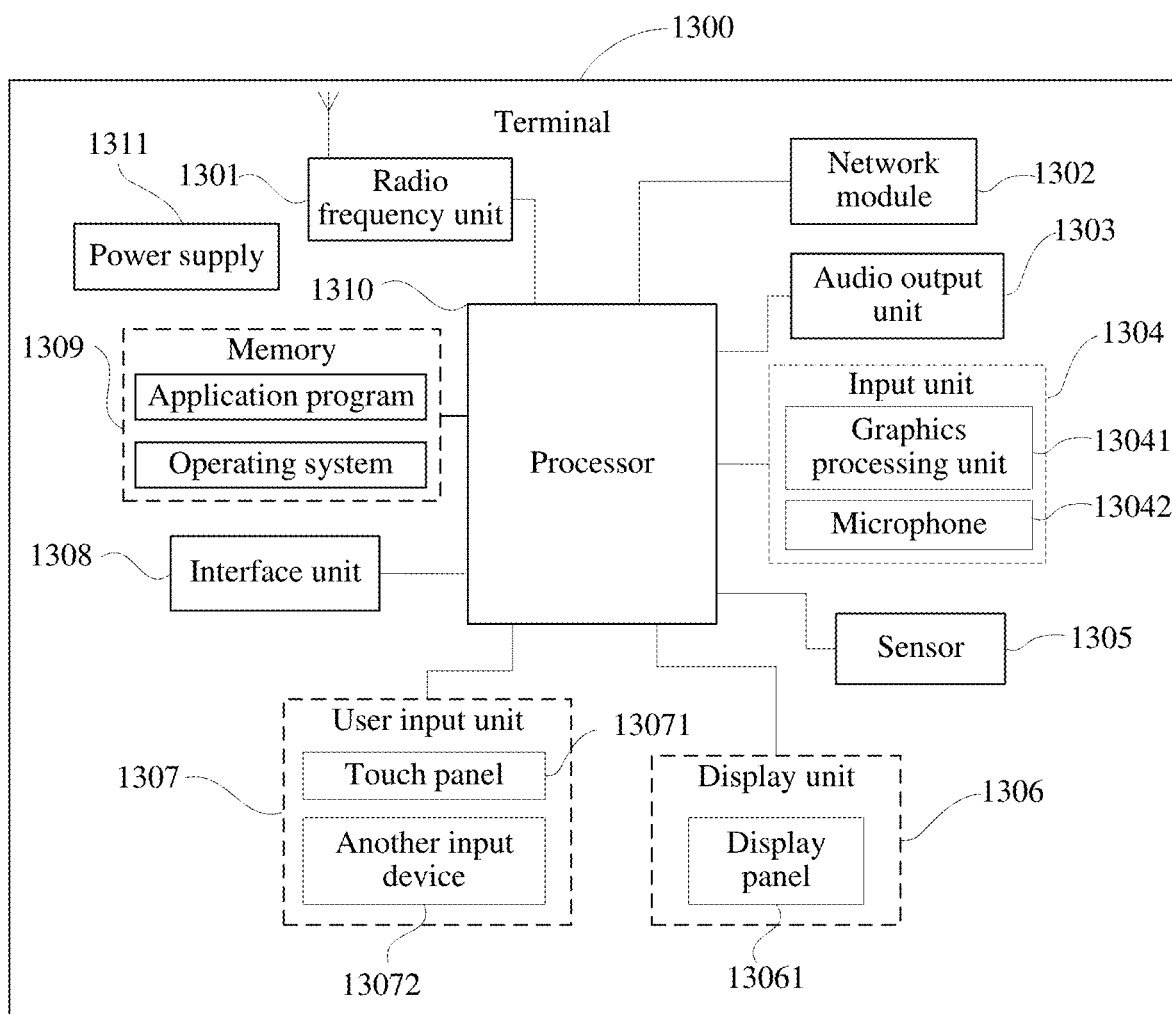
FIG. 13 is another structural diagram of a terminal according to some embodiments of the present disclosure.

FIG. 13 is a schematic diagram of a hardware structure of a terminal according to embodiments of this disclosure.

The terminal 1300 includes but is not limited to: a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311. A person skilled in the art may understand that the structure of the terminal shown in FIG. 13 does not constitute a limitation to the terminal. The terminal may include more or fewer components than those shown in the figure, or some components may be combined, or there may be a different component arrangement. In this embodiment of the present disclosure, the terminal includes, but is not limited to, a mobile phone, a tablet computer, a notebook computer, a palmtop computer, a vehicle-mounted terminal, a wearable device, a pedometer, or the like.

In an embodiment:
The radio frequency unit 1301 is configured to report capability information, where the capability information is used to indicate whether a terminal supports a first capability, and the first capability is a capability of supporting that a PMI subband size is less than a CQI subband size.

Optionally, the capability information includes first indication information, and the first indication information is used to indicate whether the terminal supports the first capability; or
if the capability information does not include indication information of the first capability, the capability information indicates that the terminal does not support the first capability; or if the capability information does not include indication information of the first capability, the capability information indicates that the terminal supports the first capability.

Optionally, the first indication information occupies 1 bit.

Optionally, in a case where the capability information indicates that the terminal supports the first capability, the capability information includes second indication information used to indicate a minimum PMI subband size supported by the terminal.

Optionally, the second indication information is used to indicate a maximum R value supported by the terminal, and the maximum R value is a value obtained by dividing the CQI subband size by the minimum PMI subband size.

Optionally, the second indication information occupies 1 bit.

The terminal can improve the performance of the terminal and improve the accuracy of PMI feedback, thereby improving communication efficiency.

In another embodiment:

The radio frequency unit 1301 is configured to: in a case where the terminal supports a first PMI subband size, feed back a first PMI based on the first PMI subband size, where the first PMI subband size is less than a CQI subband size.

Optionally, the radio frequency unit 1301 is further configured to:

when the terminal does not support the first PMI subband size, feed back a second PMI based on a second PMI subband size, where CSI corresponding to the second PMI includes indication information used to indicate the second PMI subband size.

Optionally, the CSI includes Part1 and Part2, the Part1 includes the indication information, and the Part2 includes the PMI.

Optionally, the second PMI subband size is a minimum PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

The terminal can improve the performance of the terminal and improve the accuracy of PMI feedback, thereby improving communication efficiency.

It should be understood that in some embodiments of this disclosure, the radio frequency unit 1301 may be configured to receive and send signals in a process of receiving and sending information or calling. Optionally, the radio frequency unit 1301 receives downlink data from a base station for processing by the processor 1310, and sends uplink data to the base station. Generally, the radio frequency unit 1301 includes, but is not limited to, an antenna, at least one amplifier, a transceiver, a coupler, a low noise amplifier, a duplexer, and the like. In addition, the radio frequency unit 1301 may further communicate with other devices through a wireless communications system and network.

The terminal provides a user with wireless broadband Internet access through the network module 1302, for example, helps the user send and receive emails, browse web pages, and access streaming media.

The audio output unit 1303 may convert audio data received by the radio frequency unit 1301 or the network module 1302 or stored in the memory 1309 into an audio signal, and output the audio signal as sound. In addition, the audio output unit 1303 may further provide audio output (for example, call signal receiving sound or message receiving sound) related to a specific function performed by the terminal 1300. The audio output unit 1303 includes a loudspeaker, a buzzer, a receiver, and the like.

The input unit 1304 is configured to receive audio or video signals. The input unit 1304 may include a graphics processing unit (GPU) 13041 and a microphone 13042. The graphics processing unit 13041 processes image data of a static image or video obtained by an image capture apparatus (such as, a camera) in a video capture mode or an image capture mode. A processed image frame can be displayed on the display unit 1306. The image frames processed by the GPU 13041 can be stored in the memory 1309 (or another storage medium) or sent by the radio frequency unit 1301 or the network module 1302. The microphone 13042 may receive sound and can process the sound into audio data. The processed audio data can be converted into a format output that can be sent to a mobile communications base station through the radio frequency unit 1301 in a telephone call mode.

The terminal 1300 further includes at least one sensor 1305, for example, a light sensor, a motion sensor, and other sensors. The light sensor includes an ambient light sensor and a proximity sensor, where the ambient light sensor can adjust brightness of the display panel 13061 based on brightness of ambient light, and the proximity sensor can turn off the display panel 13061 and/or backlight when the terminal 1300 moves towards the ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 1305 may further include a fingerprint sensor, a pressure sensor, an iris sensor, a molecular sensor, a gyroscope, a barometer, a hygrometer, a thermometer, an infrared sensor, and the like. This is not described herein.

The display unit 1306 is configured to display information entered by the user or information provided for the user. The display unit 1306 may include a display panel 13061, and the display panel 13061 may be configured in a form of a liquid crystal display (LCD), an organic light-emitting diode (OLED), or the like.

The user input unit 1307 can be configured to receive input numeric or character information, and generate key signal inputs related to user settings and function control of the terminal. The user input unit 1307 includes a touch panel 13071 and another input device 13072. The touch panel 13071, also called a touch screen, can collect a touch operation of the user on or near the touch panel 13071 (For example, the user uses any suitable object or accessory such as a finger or a stylus to operate on or near the touch panel 13071). The touch panel 13071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 1310, and can receive and execute a command sent by the processor 1310. In addition, the touch panel 13071 may be implemented by using a plurality of types such as a resistive type, a capacitive type, an infrared ray, and a surface acoustic wave. In addition to the touch panel 13071, the user input unit 1307 may further include the another input device 13072. The another input device 13072 may include but is not limited to one or more of a physical keyboard, a function key (such as a volume control key or an on/off key), a trackball, a mouse, a joystick, and the like. Details are not described herein.

The touch panel 13071 may cover the display panel 13061. When the touch panel 13071 detects a touch operation on or near the touch panel, the touch operation is transmitted to the processor 1310 to determine a type of a touch event, and then the processor 1310 provides corresponding visual output on the display panel 13061 according to the type of the touch event. Although in FIG. 13, the touch panel 13071 and the display panel 13061 are configured as two independent components to implement input and output functions of the terminal, in some embodiments, the touch panel 13071 and the display panel 13061 can be integrated to implement the input and output functions of the terminal. Details are not limited herein.

The interface unit 1308 is an interface for connecting an external apparatus to the terminal 1300. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 1308 may be configured to receive input (for example, data information and power) from the external apparatus and transmit the received input to one or more elements in the terminal 1300, or may be configured to transmit data between the terminal 1300 and the external apparatus.

The memory 1309 may be configured to store software programs and various data. The memory 1309 may mainly include a program storage area and a data storage area. The program storage area may store an operating system, an application required by at least one function (such as a sound playback function and an image playback function), and the like. The data storage area may store data (such as audio data and a phone book) created based on use of the mobile phone, and the like. In addition, the memory 1309 may include a high-speed random access memory or a nonvolatile memory, for example, at least one disk storage device, a flash memory, or another volatile solid-state storage device.

The processor 1310 is a control center of the user equipment. The processor 1310 uses various interfaces and lines to connect the various parts of the entire user equipment, and performs various functions of the user equipment and processes data by running or executing software programs and/or modules stored in the memory 1309 and invoking data stored in the memory 1309, to monitor the user equipment as a whole. The processor 1310 may include one or more processing units. Optionally, the processor 1310 may integrate an application processor with a modem processor. The application processor mainly processes the operating system, a user interface, the application program, and the like, and the modem processor mainly processes wireless communication. It can be understood that the foregoing modem processor may not be integrated into the processor 1310.

The terminal 1300 may further include a power supply 1311 (for example, a battery) that supplies power to various components. Optionally, the power supply 1311 may be logically connected to the processor 1310 through a power supply management system, to perform functions of managing charging, discharging, and power consumption through the power supply management system.

In addition, the terminal 1300 includes some function modules not shown, and details are not described herein.

Optionally, some embodiments of the present disclosure further provide a terminal, including a processor 1310, a memory 1309, and a computer program stored in the memory 1309 and executable on the processor 1310. When the computer program is executed by the processor 1310, the processes of the foregoing embodiments of the capability information reporting method or the PMI feedback method are implemented, with the same technical effects achieved. To avoid repetition, details are not described herein again.

Figure 14:
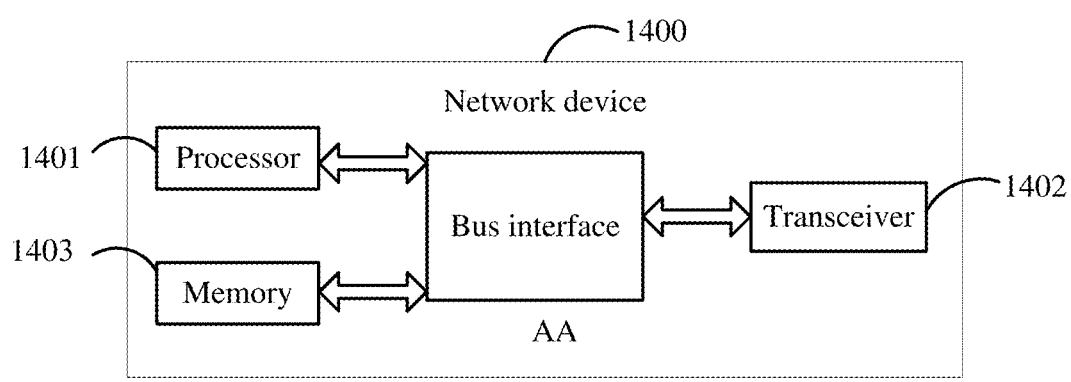
FIG. 14 is another structural diagram of a network device according to some embodiments of the present disclosure.

Referring to FIG. 14, FIG. 14 is a structural diagram of another network device according to some embodiments of the present disclosure. As shown in FIG. 14, a network device 1400 includes: a processor 1401, a transceiver 1402, a memory 1403 and a bus interface:

In an embodiment:

The transceiver 1402 is configured to receive reported capability information, where the capability information is used to indicate whether a terminal supports a first capability, and the first capability is a capability of supporting that a PMI subband size is less than a CQI subband size.

Optionally, the capability information includes first indication information, and the first indication information is used to indicate whether the terminal supports the first capability; or if the capability information does not include indication information of the first capability, the capability information indicates that the terminal does not support the first capability; or if the capability information does not include indication information of the first capability, the capability information indicates that the terminal supports the first capability.

Optionally, the first indication information occupies 1 bit.

Optionally, in a case where the capability information indicates that the terminal supports the first capability, the capability information includes second indication information used to indicate a minimum PMI subband size supported by the terminal.

Optionally, the second indication information is used to indicate a maximum R value supported by the terminal, and the maximum R value is a value obtained by dividing the CQI subband size by the minimum PMI subband size.

Optionally, the second indication information occupies 1 bit.

The network device can improve the performance of the terminal and improve the accuracy of PMI feedback, thereby improving communication efficiency.

In another embodiment:

The transceiver 1402 is configured to: when a terminal supports a first PMI subband size, receive a first PMI fed back by the terminal based on the first PMI subband size, where the first PMI subband size is less than a CQI subband size.

Optionally, the transceiver 1402 is further configured to:
when the terminal does not support the first PMI subband size, receiving a second PMI fed back by the terminal based on a second PMI subband size, where CSI corresponding to the second PMI includes indication information used to indicate the second PMI subband size.

Optionally, the CSI includes Part1 and Part2, the Part1 includes the indication information, and the Part 2 includes the PMI.

Optionally, the second PMI subband size is a minimum PMI subband size supported by the terminal.

Optionally, the indication information occupies 1 bit, the 1 bit is used to indicate a maximum R value supported by the terminal, and the maximum R value is a value obtained by dividing the CQI subband size by the minimum PMI subband size.

The network device can improve the performance of the terminal and improve the accuracy of PMI feedback, thereby improving communication efficiency.

The transceiver 1402 is configured to receive and send data under the control of the processor 1401. The transceiver 1402 includes at least two antenna ports.

In FIG. 14, a bus architecture may include any quantity of interconnected buses and bridges. Optionally, various circuits of one or more processors represented by the processor 1401 and a memory represented by the memory 1403 are interconnected. The bus architecture may further connect together various other circuits of a peripheral device, a voltage stabilizer, a power management circuit, and the like, which are known in this art and will not be further described herein. The bus interface provides an interface. The transceiver 1402 may be a plurality of elements, that is, include a transmitter and a receiver, and provide units for communication with various other apparatuses on a transmission medium. For different user equipment, the user interface 1404 may alternatively be an interface for externally and internally connecting a required device. The connected device includes, but not limited to, a keypad, a display, a loudspeaker, a microphone, a joystick, and the like.

The processor 1401 is responsible for managing the bus architecture and common processing, and the memory 1403 may store data used when the processor 1401 performs an operation.

Optionally, some embodiments of the present disclosure further provide a network device, including a processor 1401, a memory 1403, and a computer program that is stored in the memory 1403 and that can run on the processor 1401. When the processor 1401 executes the computer program, the foregoing processes of the embodiment of the capability information reporting method or the PMI feedback method are implemented and a same technical effect can be achieved. To avoid repetition, details are not described herein again.

Some embodiments of the present disclosure further provide a non-transitory computer-readable storage medium, where the non-transitory computer-readable storage medium stores a computer program, the computer program, when executed by the processor, implements the processes of the embodiments of the capability information reporting method or the PMI feedback method on a terminal side provided in some embodiments of the present disclosure, or the computer program, when executed by the processor, implements the processes of the embodiments of the capability information reporting method or the PMI feedback method on a network device side provided in some embodiments of the present disclosure, and the same technical effects can be achieved. To avoid repetition, details are not described herein again. The non-transitory computer-readable storage medium may be a read-only memory (ROM), a random access memory (RAM), a magnetic disk, a compact disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus Without being subject to further limitations, an element defined by a phrase "including a" does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing function modules (for example, a process and a function) in the embodiments of the present disclosure. Software code can be stored in the memory and executed by the processor. The memory can be implemented inside or outside the processor.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A capability information reporting method, applied to a terminal, comprising:
   reporting capability information, wherein the capability information is used to indicate whether the terminal supports a first capability, and the first capability is a capability of supporting that a precoding matrix indicator (PMI) subband size is less than a channel quality indicator (CQI) subband size; and if the capability information does not comprise indication information of the first capability, the capability information indicates that the terminal does not support the first capability.

2. The method according to claim 1, wherein in a case where the capability information indicates that the terminal supports the first capability, the capability information comprises second indication information used to indicate a minimum PMI subband size supported by the terminal.

3. The method according to claim 2, wherein the second indication information is used to indicate a maximum R value supported by the terminal, and the maximum R value is a value obtained by dividing the CQI subband size by the minimum PMI subband size.

4. The method according to claim 3, wherein the second indication information occupies 1 bit.

5. The method according to claim 1, wherein the terminal proactively reports the capability information, or the terminal reports the capability information after receiving capability request information sent by a network device.

6. A terminal, comprising: a memory, a processor, and a program stored in the memory and executable on the processor, wherein the program, when executed by the processor, causes the terminal to perform:
reporting capability information, wherein the capability information is used to indicate whether the terminal supports a first capability, and the first capability is a capability of supporting that a precoding matrix indicator (PMI) subband size is less than a channel quality indicator (CQI) subband size; and if the capability information does not comprise indication information of the first capability, the capability information indicates that the terminal does not support the first capability.

7. The terminal according to claim 6, wherein in a case where the capability information indicates that the terminal supports the first capability, the capability information comprises second indication information used to indicate a minimum PMI subband size supported by the terminal.

8. The terminal according to claim 7, wherein the second indication information is used to indicate a maximum R value supported by the terminal, and the maximum R value is a value obtained by dividing the CQI subband size by the minimum PMI subband size.

9. The method according to claim 8, wherein the second indication information occupies 1 bit.

10. The terminal according to claim 6, wherein the terminal reports the capability information, or the terminal reports the capability information after receiving capability request information sent by a network device.

11. A non-transitory computer-readable storage medium, wherein the non-transitory computer-readable storage medium stores a computer program, and the computer program, when executed by a processor of a terminal, causes the terminal to perform:
reporting capability information, wherein the capability information is used to indicate whether the terminal supports a first capability, and the first capability is a capability of supporting that a precoding matrix indicator (PMI) subband size is less than a channel quality indicator (CQI) subband size; and if the capability information does not comprise indication information of the first capability, the capability information indicates that the terminal does not support the first capability.

12. The non-transitory computer-readable storage medium according to claim 11, wherein in a case where the capability information indicates that the terminal supports the first capability, the capability information comprises second indication information used to indicate a minimum PMI subband size supported by the terminal.

13. The non-transitory computer-readable storage medium according to claim 12, wherein the second indication information is used to indicate a maximum R value supported by the terminal, and the maximum R value is a value obtained by dividing the CQI subband size by the minimum PMI subband size.

14. The non-transitory computer-readable storage medium according to claim 13, wherein the second indication information occupies 1 bit.

15. The non-transitory computer-readable storage medium according to claim 11, wherein the terminal reports the capability information, or the terminal reports the capability information after receiving capability request information sent by a network device.

* * * * *